Oct. 8, 1940.　　　　R. L. RUDE　　　　2,217,643
FLUID METER
Filed July 9, 1937　　　2 Sheets-Sheet 2

Inventor
Robert L. Rude
By Amos, Thiess, Olson & Mecklenburger
Attys.

Patented Oct. 8, 1940

2,217,643

UNITED STATES PATENT OFFICE 2,217,643

FLUID METER

Robert L. Rude, Toronto, Ontario, Canada, assignor to The British American Oil Company, Limited, Toronto, Ontario, Canada, a corporation of Canada Application July 9, 1937, Serial No. 152,859

3 Claims. (Cl. 73—211)

This invention relates to a fluid meter provided with means for preventing the deleterious effects resulting from the formation of solid material around a portion of the metering element when the fluid passing said element contains substances which are prone to solidify under certain conditions on the inner walls of a conduit through which such fluid is passing and which formation is particularly undesirable when it occurs in the vicinity of a metering element in such conduit, as for instance, the formation of coke adjacent to a metering element which is positioned in the path of a heated hydrocarbon fluid.

For the sake of simplicity, the invention will be described in connection with the showing of a primary metering element which may be associated with a conduit through which conduit a heavy hydrocarbon is passed at elevated temperatures, and wherein the primary metering device interposes an obstruction in the fluid path to determine certain values.

The invention broadly comprises a fluid meter provided with means for removing some of the heat from the fluid at the precise point where the carbon tends to form, this removal being accomplished in one form by the provision of cooling means adjacent those portions of the metering device where coke thus tends to form. In the example shown herein, it is accomplished by the provision of means for conducting a relatively cooler fluid to those portions of the primary metering device, thereby to prevent such formation that may interfere with the proper functioning of the primary metering device. In this connection it may be stated that applicant has conducted calibrations on primary metering devices of this type, and in which it has been found that considerable coke is deposited on the upstream and downstream sides of the plate, and has determined that the errors tend to cancel out in a manner which eliminates discrepancies of undesirable magnitude.

The invention therefore contemplates the provision of mechanical means for effecting temperature reduction at the point above indicated.

It is accordingly deemed convenient first to describe the apparatus embodying the aforesaid means and—after the problems inherent in the functioning of such apparatus have been appreciated—to describe further the advantages resident in the hereinafter claimed structure.

Figure 1:
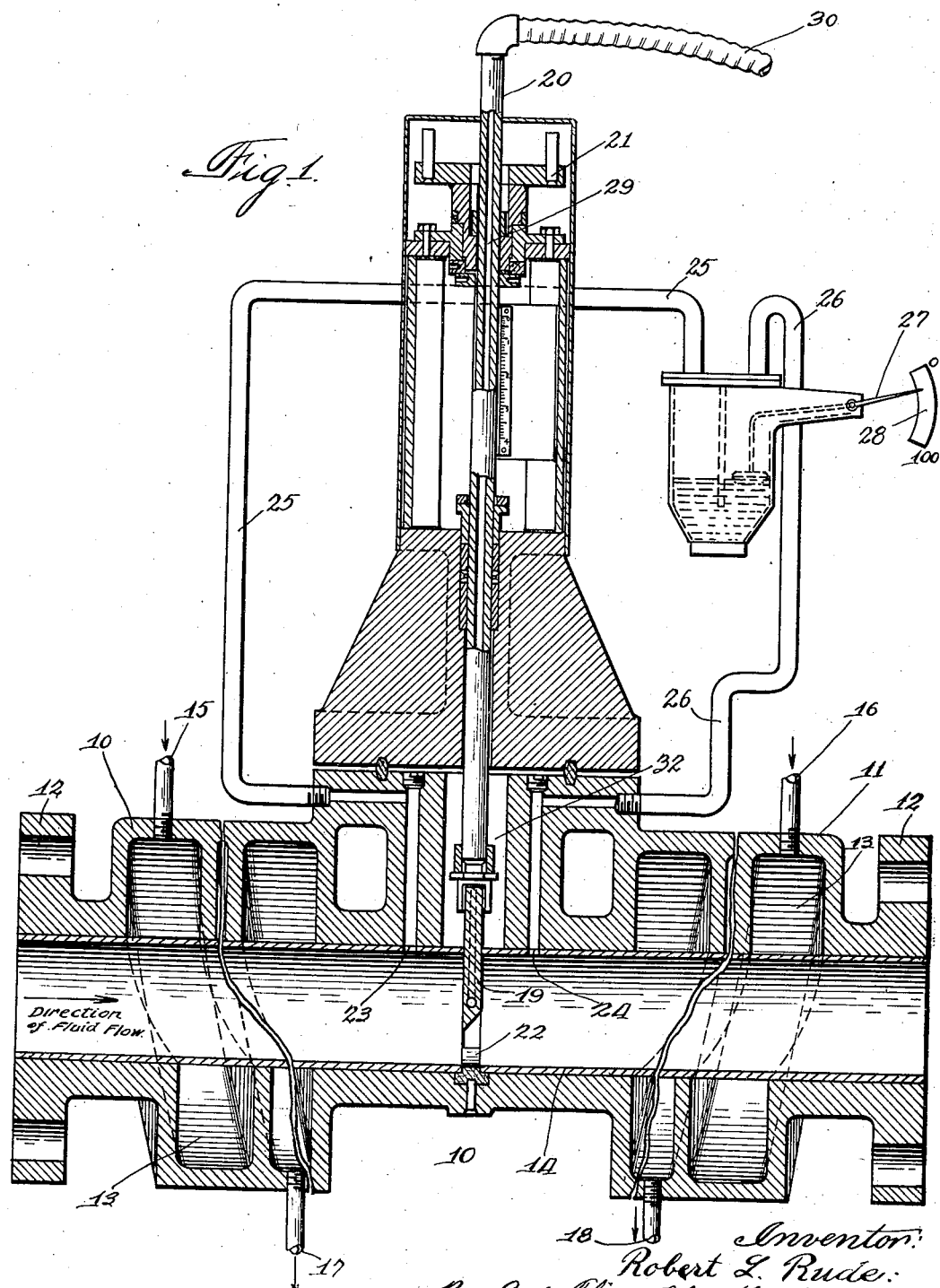
Fig. 1 is an elevational sectional view of a primary metering element associable with a conduit or fluid path for measuring certain values of said fluid, and a secondary metering device connected to said primary device.

A conduit portion 10 of the metering device comprises a casting 11 provided at its ends with flanges 12, 12 through which bolts may be passed to secure the metering device in an ordinary fluid conveying conduit. It will be observed that the casting 11 is provided in both halves thereof with a three-sided spiral channel 13, 13, the fourth side of which is formed by a liner 14 thereby to provide a spiral fluid-conveying passage adjacent the interior surface of the metering element body 10. Inlet pipes 15 and 16 serve to admit fluid to the spiral passages at either end of the body, which fluid may withdraw through pipes 17 and 18, it being understood, of course, that the division of the spiral passage into two parts is for convenience only and that if desired the fluid leaving through 17 might be fed into 16.

The fluid metering device also embodies a plate 19 which is attached to and is movable vertically by a stem 20, a wheel 21 being secured to the stem to effect such vertical movement. The plate 19 is in no sense a valve; in fact, cannot be made to function as a valve because its lowermost movement is predetermined by a stop 22 situated in the conduit portion 10 which precludes the closing of the conduit by the plate 19. The pressure variations produced as a fluid flows past the plate 19 are transmitted through channels 23 and 24—situated on either side of the plate 19—to pressure leads 25 and 26, respectively, and the latter are connected into a differential indicator, the structure of which it is not necessary here to describe. The reading derived from the aforesaid metering or indicating is indicated by a needle 27 and a dial 28.

A primary metering device of the character just described is sometimes referred to as an adjustable orifice, and it is extremely desirable that the metering done in connection therewith shall be so performed that no solid matter will develop or be formed in such manner as to effect the accuracy of the metering element. However, when highly heated fluids, particularly certain hydrocarbons, are passed through such a metering device, there is, in some types of operations, a tendency to the formation of coke in the conduit immediately ahead of and immediately after the adjustable orifice. The theory thought responsible for this formation is that—although the flow of fluid through the metering device is at a relatively high velocity—the slow moving film adjacent to the inner wall of the conduit nevertheless so moves that the heavy hydrocarbons are held at a cracking temperature for a sufficient time to permit polymerization and the formation of coke on the inner walls of the conduit.

Coke may be formed not only on the inner walls of the conduit but also on the interposed metering plate. The present invention involves the removal of a sufficient amount of the heat from the film at the point where the fluid tends to form the objectionable carbon or coke deposits. It has been found necessary to remove only a small amount of such heat to reduce the film temperature adjacent the interior of the conduit and adjacent the plate 19 to a temperature low enough to preclude the formation of coke on the inside of the conduit. It has also been discovered that, by the injection of a small quantity of fluid through the stem of the adjustable orifice and the subsequent circulation of this fluid within or adjacent to the orifice plate, coke formation on the surface of the plate and in the vicinity of the upper portion of the plate is prevented or reduced to a degree that does not affect the accuracy or operability of the metering element.

Not only does removal of heat from the plate itself promote the accuracy in the metering function performed thereby, but in addition the same heat removal prevents undesirable expansion of the orifice plate as high temperature fluid moves thereby. This latter is a matter of great advantage because of the necessity of reconciling the two diverse requirements, i. e., (1) that the plate shall fit and move closely through the opening in the adjacent portions of the conduit in order that the metering may be accurate and (2) at the same time that the plate should not expand to such an extent that it will bind in the opening just referred to.

The removal of heat from the slow moving film of fluid adjacent the inner surface of the conduit has been described in connection with the supply of cooling fluid through the pipes 15 and 16.

Figure 2:
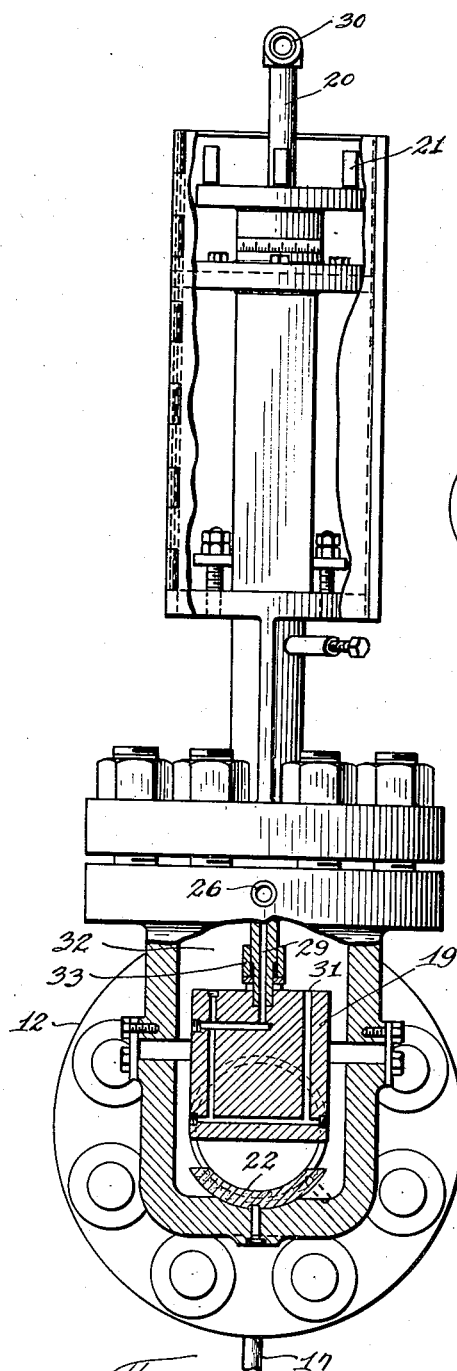
Fig. 2 is a sectional view taken at right angles to the view in Fig. 1 and intermediate of the faces of an orifice plate used in the primary metering device.

The removal of heat directly from the orifice plate and the vicinity thereof is accomplished through the use of a channel 29 located centrally of the stem 20, the latter having connected thereto a flexible connection 30 through which cooling fluid may be properly fed even though said stem 20 is moved vertically. Channel 29 at the lower portion of the stem (see Fig. 2) communicates with a circulating channel 31 formed within the plate 19. The fluid circulated through channel 29 and thence through the plate channel 31 passes out into a space 32 within the confines of which latter the mechanical connection between the plate 19 and the stem 20 is effected, as for instance at 33. It is necessary to insure the non-expansion of the connection 33 and accordingly the cooling fluid, after passing through the plate, emerges into the space 32. After the material has filled the space 32, it is gradually forced out between the sides of plate 19, where the latter passes through the liner 14, and into the fluid flowing through the measuring device.

Figure 3:
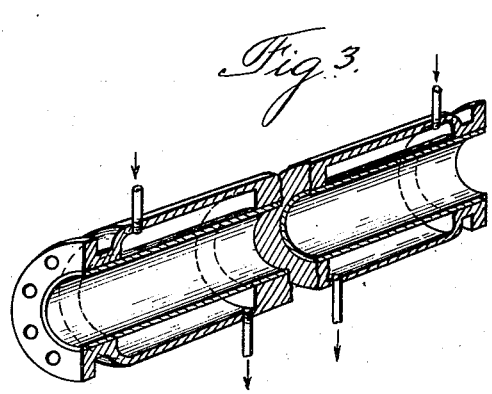
Fig. 3 is a fragmentary half sectional perspective view of the conduit portion only of an apparatus in which the invention is practiced.
Figure 4:
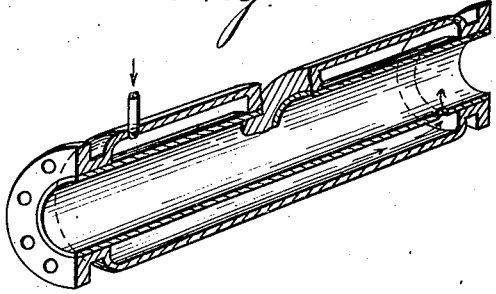
Fig. 4 is a view similar to Fig. 3 but wherein the path of the temperature modifying medium is different from that shown in Fig. 3.

It has heretofore been suggested that the means for removing heat from the fluid adjacent the inner surface of the portion of the metering device may be modified. In Fig. 3 the channel is continuous on either side of the orifice plate or, as shown in Fig. 4, the two sides of the casting may be connected so that the fluid jacket is substantially continuous.

As a still further modification, it may be found desirable to introduce the fluid on the "upstream" side of the plate 19 and permit the fluid, after it has performed its heat removing function, to enter directly into the flowing stream at the lower or downstream side of the orifice plate. This last modification is also illustrated in Fig. 4. The fluid from the jacket may thus be fed into the flowing fluid in a manner that does not affect the accuracy of the meter.

It will of course be apparent that any desired cooling medium may be employed for circulation through the various cooling passages hereinbefore described, and inasmuch as the invention in some instances contemplates discharging the cooling medium into the flowing fluid being metered, it is preferable to use a similar or related fluid as the cooling medium. Whatever the character of the cooling medium, it is of primary importance that the temperature thereof be so selected and controlled as to effect a sufficient reduction in the temperature of the hot hydrocarbon fluid being metered to prevent such a degree of deposition of solids therefrom as would produce errors in the pressure differential measurements.

I claim:

1. In an apparatus for accurately metering hot fluids flowing through a conduit at temperatures which tend to cause excessive deposition of solids from said fluid upon partial obstruction of said flowing fluid, the combination of a plate extending through an aperture in one wall of said conduit and forming an orifice therein, means for moving said plate transversely of said conduit to adjust said orifice, means for measuring the differential pressure across said orifice upon the flow of said fluid therethrough to obtain an accurate indication of the character of said fluid, a sealed chamber enclosing the portion of said conduit which includes said aperture, and means including passageways in said plate for circulating a cooling medium through said plate and discharging said cooling medium into said chamber to cool said plate and said conduit so as sufficiently to reduce the temperature of said fluid as to prevent material deposition of solids from said fluid adjacent said orifice, whereby the introduction of errors into said differential pressure measurement due to such deposition of solids is prevented, said aperture permitting the flow of said cooling medium from said chamber about said plate and into said conduit.

2. In an apparatus for accurately metering a hot fluid, which apparatus includes a conduit section having an adjustable orifice plate extending through an aperture in one wall thereof and means for measuring the pressure differential across said orifice upon the flow of said fluid through said conduit, the combination of means for sufficiently cooling said fluid adjacent said orifice to prevent such deposition of solids from said fluid as would interfere with the accuracy of said differential pressure measurements, said cooling means including a chamber enclosing said conduit and orifice plate, and also including passageways for circulating cooling medium through said plate and discharging said cooling medium into said chamber about said conduit, said aperture permitting the flow of said cooling medium about said plate and into said conduit.

3. In an apparatus for accurately metering a hot fluid, which apparatus includes a conduit section having an adjustable orifice plate extending through an aperture in one wall thereof and means for measuring the pressure differential across said orifice upon the flow of said fluid through said conduit, the combination of means for cooling said orifice plate and said conduit section including a chamber enclosing the portion of said conduit section having said aperture and orifice plate therein, means including passageways in said plate for circulating a cooling medium therethrough and discharging said cooling medium into said chamber about said conduit, said aperture providing for the discharge of said cooling medium from said chamber into said conduit, and additional cooling medium passageways in heat exchanging relation with adjacent portions of said conduit for effecting cooling of said adjacent portions.

ROBERT L. RUDE.